United States Patent [19]

Müller

[11] 4,379,600
[45] Apr. 12, 1983

[54] JOURNAL BEARING WITH DUST SEAL

[75] Inventor: Armin Müller, Kronungen, Fed. Rep. of Germany

[73] Assignee: FAG Kugelfischer Georg Schäfer & Co., Schweinfurt, Fed. Rep. of Germany

[21] Appl. No.: 217,390

[22] Filed: Dec. 17, 1980

[30] Foreign Application Priority Data

Dec. 20, 1979 [DE] Fed. Rep. of Germany ... 7935867[U]

[51] Int. Cl.³ ............................................. F16C 33/80
[52] U.S. Cl. .................................. 308/187.1; 277/56
[58] Field of Search ................ 308/187.2, 187.1, 36.1; 277/55, 56, 54, 53, 57

[56] References Cited

U.S. PATENT DOCUMENTS

| 2,590,422 | 3/1952 | Large | 277/53 |
| 2,886,351 | 5/1959 | Heard | 277/53 |
| 3,113,814 | 12/1963 | Ogura | 277/53 |
| 3,129,985 | 4/1964 | Watson | 277/53 |

Primary Examiner—Lenard A. Footland
Attorney, Agent, or Firm—Karl F. Ross

[57] ABSTRACT

One of two coaxial races of a ball or roller bearing is provided near an edge thereof with an internal annular groove into which a peripheral lip of a plastically deformable sealing ring of generally L-shaped half-section is forced by camming engagement with an axially more inwardly positioned annular member resting against a transverse shoulder of that race. The annular member may be a lip seal in contact with the other race or may be part, together with the deformable ring, of a labyrinth seal including at least one further ring mounted on that other race.

4 Claims, 5 Drawing Figures

JOURNAL BEARING WITH DUST SEAL

FIELD OF THE INVENTION

My present invention relates to a dust seal for an end of a journal bearing, with at least one set of rotary bodies such as rollers or balls in a clearance between two generally cylindrical coaxial surfaces of an inner and an outer bearing race, as well as to a method of making such a dust seal.

BACKGROUND OF THE INVENTION

It is known, e.g. from British Pat. No. 30,487 of 1909, to form each end face of the outer race of such a bearing with an undercut annular recess and forcing an outwardly bulging annular washer into each recess; upon subsequent flattening, the washer extends radially to the immediate vicinity of the inner race whereby the intervening clearance is substantially closed against the outside. This arrangement, while being theoretically satisfactory, requires very close tolerances and is therefore difficult to realize in practice.

OBJECTS OF THE INVENTION

An important object of my present invention is to provide an improved dust seal for such a bearing which is easy to install and does not necessitate a particularly high degree of precision in its manufacture.

A related object is to provide a simple method of installing such a dust seal.

SUMMARY OF THE INVENTION

In accordance with my present invention, I provide one of the confronting surfaces of the two coaxial races with an annular groove near an annular edge thereof, this groove serving as a detent for a sealing ring of generally L-shaped half-section; one of the legs of the "L", extending axially along the grooved surface, terminates in a peripheral lip which is plastically deformed into that groove while the other leg forms a transverse web extending radially close to the other surface for substantially closing the intervening clearance toward the outside.

Since structural compactness dictates a positioning of the transverse web as near as possible to the bearing end to be closed thereby, that web must be disposed at a location spaced axially outwardly from the groove receiving the deformed lip. If only one bearing end is to be sealed in this manner, and if the bearing is of limited axial length, the deformation of the lip can be readily carried out from the opposite end. When, however, the groove is inaccessible from the outside once the sealing ring is inserted, it will not be immediately apparent how this plastic deformation—as distinct from an elastic snap fit—can be achieved. I solve this problem, in accordance with a more particular feature of my invention, by first introducing a coacting annular member into the bearing clearance and positioning this member in contact with the grooved surface between the groove and a transverse shoulder of that surface spaced axially inwardly from the groove, the member being provided with an annular camming edge facing the subsequently inserted sealing ring and overlapping the groove. During insertion of the ring, a part of an axially extending flange thereof comes into contact with the camming edge of the coacting member and is either expanded or compressed thereby to enter the groove, depending on whether the latter is formed in the outer or in the inner bearing race. Upon complete insertion, the lip so formed is locked in place by the overlapping camming edge of the coating annular member first introduced.

BRIEF DESCRIPTION OF THE DRAWING

The above and other features of my invention will now be described in detail with reference to the accompanying drawing in which.

SPECIFIC DESCRIPTION

Figure 1:
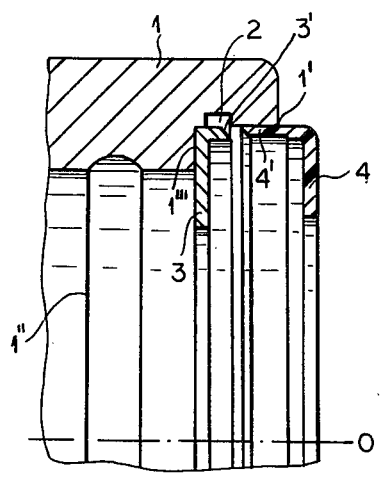
FIG. 1 is an axial sectional view of part of an outer bearing race shown prior to installation of my improved dust seal.

FIG 1 shows an outer race 1 of a ball bearing whose cylindrical inner surface, centered on an axis 0, has an annular edge 1', a shallow groove 1" forming part of a track for a set of balls 11 (FIGS. 3–5), and a transverse shoulder 1''' between edge 1' and track groove 1". This surface is further formed, between edge 1' and shoulder 1''', with an annular groove 2 of rectangular cross-section. An annular member 3, also centered on axis 0, rests against shoulder 1''' and has an axially outwardly extending flange overlapping the groove 2, this flange terminating in a beveled annular camming edge 3'.

Figure 2:
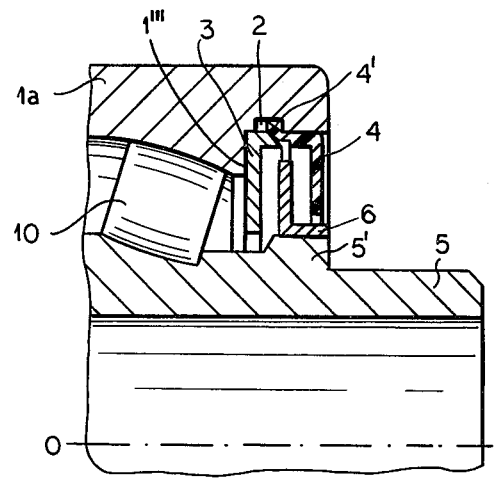
FIG. 2 is a view similar to FIG. 1 but showing part of the complete bearing and of the installed dust seal.

Also shown in FIG. 1 is a sealing ring 4 of plastically deformable (e.g. polymeric) material having a generally L-shaped half-section with a transverse leg forming a radially extending web and with an axial leg forming a flange which hugs the recessed end zone of the inner surface of race 1 while confronting the member 3 previously inserted. When ring 4 is shifted further to the left from the position illustrated in FIG. 1, a reduced part 4' of the flange comes into contact with beveled edge 3' and is expanded thereby into groove 2 where it remains locked, as shown in FIG. 2 for a slightly different outer race 1a. This Figure also illustrates a corresponding inner race 5 as well as a bearing roller 10 in the intervening clearance. A further ring 6, fitted onto a rib 5' of inner race 5, extends radially outward between members 3 and 4 to form with them a labyrinth seal.

Figure 3:
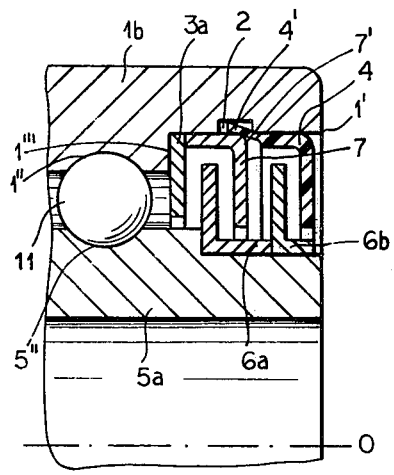
FIGS. 3 and 4 are views similar to FIG. 2, illustrating modified dust seals.

In FIG. 3 I have shown an outer race 1b, similar to the race 1 of FIG. 1 but with a recessed end zone of greater axial length, coaxially surrounding an inner race 5a and forming therewith a track 1", 5" for a set of bearing balls 11. A more elaborate labyrinth seal is here constituted by an annular disk 3a resting against the annular shoulder 1''' of race 1b, a rigid ring 7 with an L-shaped half-section similar to that of ring 4 contacting the recessed zone of race 1b as well as the disk 3a, and two stacked rings 6a, 6b (similar to ring 6 of FIG. 2) seated on a recessed surface zone of race 5a with their webs interposed between members 3, 7 and 7, 4, respectively. An annular camming edge 7' is here formed by the curved junction of the legs of the "L" of ring 7 which in this embodiment overlaps the groove 2 of race 1b and, upon assembly, deforms the lip 4' of ring 4 into that groove.

Figure 4:
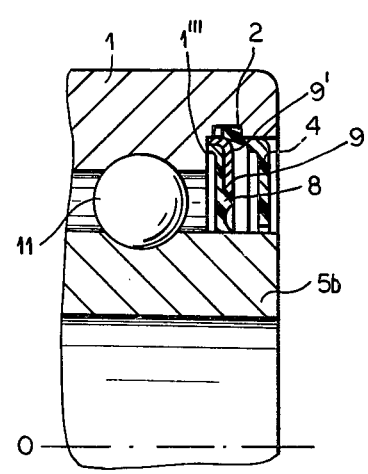

FIG. 4 shows the ring 1 of FIG. 1 together with an inner race 5b and a pre-inserted member 8 of flexible plastic material resting against shoulder 1''' while also contacting the inner race —in contrast to member 3 of FIGS. 1 and 2—to form a lip seal. Member 8 is partly overlain by a rigid backing ring 9 forming an annular camming edge 9' for expanding the lip of sealing ring 4 as described above.

Figure 5:
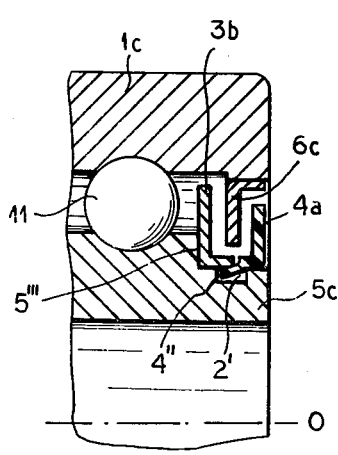
FIG. 5 is a further view similar to the preceding ones, illustrating an inversion.

In FIG. 5 an inverted counterpart of the labyrinth seal of FIG. 2 is formed between ball-bearing races 1c and 5c by an intermediate ring 6c, a camming ring 3b resting against a shoulder 5''' of inner race 5c, and a sealing ring 4a having a lip 4'' deformed inward by ring 3b into an annular groove 2' of race 5c. It will be apparent that the dust seals of FIGS. 3 and 4 may be similarly inverted.

Naturally, the nonillustrated left-hand ends of the bearings of FIGS. 1-5 may be fitted with seals mirror—symmetrical to those shown.

I claim:

1. In a journal bearing having an inner race and an outer race with confronting, generally cylindrical coaxial surfaces accommodating a set of rotary bodies in a clearance therebetween, the combination therewith of a sealing ring of generally L-shaped half-section centered on the axis of said surfaces and provided with a plastically deformed peripheral lip received in an annular groove of one of said surfaces near an annular edge thereof, said sealing ring having a web extending radially close to the other of said surfaces at a location spaced axially outwardly from said groove for substantially closing said clearance toward the outside, said one of said surfaces being formed with a transverse shoulder spaced axially inwardly from said groove, and an annular member centered on said axis and in contact with said one of said surfaces between said shoulder and said groove, said member being provided with an annular camming edge overlapping said groove and facing said sealing ring while locking said lip in said groove.

2. The combination defined in claim 1 wherein said member extends radially close to said other of said surfaces in spaced-apart relationship with the web of said sealing ring.

3. The combination defined in claim 2 wherein said sealing ring and said member are part of a labyrinth seal including a further ring extending radially from said other of said surfaces between said sealing ring and said member.

4. A method of providing a dust seal for an end of a journal bearing having an inner race and an outer race with confronting, generally cylindrical coaxial surfaces accommodating a set of rotary bodies in a clearance therebetween, comprising the steps of:

forming an annular groove in one of said surfaces near an annular edge thereof;

introducing an annular member with an axially outwardly facing annular camming edge into said clearance, said camming edge overlapping said groove with said member bearing upon a transverse shoulder of said one of said surfaces, thereafter axially inserting a sealing ring of plastically deformable material past said annular edge into said clearance, said sealing ring having a web transverse to said surfaces fitting into said clearance and an axially inwardly extending peripheral flange adjoining said one of said surfaces while overlapping said groove in the inserted position; and plastically deforming the overlapping part of said flange into said groove, by contact of said flange with said camming edge during the insertion step, to hold said sealing ring in its inserted position.

* * * * *